(12) United States Patent
Suda et al.

(10) Patent No.: US 10,843,661 B2
(45) Date of Patent: Nov. 24, 2020

(54) ELECTRONIC KEY MANAGEMENT SYSTEM ASSISTING DEVICE, ELECTRONIC KEY MANAGEMENT SYSTEM, METHOD, AND STORAGE MEDIUM

(71) Applicant: HONDA MOTOR CO., LTD., Tokyo (JP)

(72) Inventors: Satoshi Suda, Wako (JP); Shinichi Ueda, Wako (JP); Masashi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 16/352,873

(22) Filed: Mar. 14, 2019

(65) Prior Publication Data

US 2019/0291695 A1    Sep. 26, 2019

(30) Foreign Application Priority Data

Mar. 20, 2018    (JP) .................................. 2018-053421

(51) Int. Cl.
*B60R 25/24* (2013.01)
*G07C 9/21* (2020.01)
*G07C 9/27* (2020.01)

(52) U.S. Cl.
CPC .......... *B60R 25/241* (2013.01); *B60R 25/246* (2013.01); *G07C 9/21* (2020.01); *G07C 9/27* (2020.01)

(58) Field of Classification Search
CPC ..... B60R 25/241; B60R 25/246; B60R 25/24; G07C 9/21; G07C 9/00309; H04L 2209/24; H04L 9/0822
See application file for complete search history.

(56) References Cited

U.S. PATENT DOCUMENTS

2008/0150683 A1* 6/2008 Mikan ................ G07C 9/00309
340/5.31
2009/0271051 A1* 10/2009 Teramura ................ B60R 25/04
701/1
(Continued)

FOREIGN PATENT DOCUMENTS

JP    2005-254868    9/2005
JP    2006-290246    10/2006
(Continued)

OTHER PUBLICATIONS

Japanese Notice of Allowance for Japanese Patent Application No. 2018-053421 dated Nov. 26, 2019.

*Primary Examiner* — Mirza F Alam
(74) *Attorney, Agent, or Firm* — Amin, Turocy & Watson, LLP

(57) ABSTRACT

An electronic key management system assisting device including: a connector (31) that is mounted in a vehicle and is used for a connection with an in-vehicle authentication device communicating with a management server using an in-vehicle communication device; and a requester (35B) that requests the management server to transmit an execution key for obtaining a permission for a transition to a registration mode in which an electronic key of the vehicle is registered in the in-vehicle registration device or an invalidation mode in which the electronic key registered in the in-vehicle registration device is invalidated using a communication device other than the in-vehicle communication device in a case which the in-vehicle authentication device connected through the connector is not able to communicate with the management server using the in-vehicle communication device.

16 Claims, 10 Drawing Sheets

(56) References Cited

U.S. PATENT DOCUMENTS

| | | | | |
|---|---|---|---|---|
| 2014/0359292 A1* | 12/2014 | Kawamura | ........... | H04L 9/0822 |
| | | | | 713/168 |
| 2017/0076524 A1* | 3/2017 | Yoshihara | ............... | B60R 16/02 |
| 2018/0136924 A1* | 5/2018 | Okuyama | ................. | G06F 8/65 |

FOREIGN PATENT DOCUMENTS

| | | |
|---|---|---|
| JP | 5257814 | 8/2013 |
| JP | 2013-184598 | 9/2013 |
| JP | 2013-189754 | 9/2013 |
| JP | 2013-231281 | 11/2013 |
| JP | 2013-234520 | 11/2013 |
| JP | 2014-156722 | 8/2014 |
| JP | 2016-145509 | 8/2016 |
| KR | 10-2009-0061695 | 6/2009 |

\* cited by examiner

131

| VEHICLE BODY NUMBER | DEALER MAIL ADDRESS | USER MAIL ADDRESS | EXECUTION KEY |
|---|---|---|---|
| 00001005 | AAA@abc.com | BBB@abc.com | XXXXYYYY |
| ... | ... | ... | ... |
| ... | ... | ... | ... |
| ... | ... | ... | ... |

ELECTRONIC KEY MANAGEMENT SYSTEM ASSISTING DEVICE, ELECTRONIC KEY MANAGEMENT SYSTEM, METHOD, AND STORAGE MEDIUM

CROSS-REFERENCE TO RELATED APPLICATION

Priority is claimed on Japanese Patent Application No. 2018-053421, filed Mar. 20, 2018, the content of which is incorporated herein by reference.

BACKGROUND OF THE INVENTION

Field of the Invention

The present invention relates to an electronic key management system assisting device, an electronic key management system, a method, and a storage medium.

Description of Related Art

In recent years, electronic keys have become widely used as keys for vehicles. An electronic key and a vehicle are associated with each other in advance using an immobilizer mounted in the vehicle. The association between a vehicle and an electronic key, for example, is performed in a dealer store when the vehicle is delivered to a purchaser or when an electronic key is lost. In a dealer store, a diagnostic device to be connected to an immobilizer through a cable is prepared, and, in a case in which necessary information is input from the diagnostic device, an operation mode of the immobilizer is switched to a registration mode in which association between a vehicle and an electronic key can be executed. When the immobilizer executing the registration mode receives inherent key information from an electronic key, a vehicle and the electronic key are associated with each other.

In relation to this, a technology is known in which a registration code that is necessary for executing a registration mode is generated by a center, an in-vehicle device executes an authentication process based on the registration code received from the center, and the in-vehicle device and the electronic key are associated with each other in a case in which the authentication is successful (for example, see Japanese Patent No. 5257814).

SUMMARY OF THE INVENTION

However, in the conventional technology, there is a problem in that key information of an electronic key cannot be registered in a case in which the in-vehicle device cannot communicate with the center. For example, a case in which a vehicle cannot be operated at a place at which a communication environment is not good such as an underground parking lot, in mountains, or the like, a case in which a communication device included in the in-vehicle device malfunctions, or the like corresponds thereto.

An aspect of the present invention is in consideration of such situations, and one object thereof is to provide an electronic key management system assisting device, an electronic key management system, a method, and a storage medium capable of providing a remedial action in a situation in which it is difficult for an in-vehicle device to communicate with the center.

An electronic key management system assisting device, an electronic key management system, a method, and a storage medium according to the present invention employ the following configurations.

(1): An electronic key management system assisting device according to one aspect of the present invention is an electronic key management system assisting device including: a connector that is mounted in a vehicle and is used for a connection with an in-vehicle authentication device communicating with a management server using an in-vehicle communication device; and a requester that requests the management server to transmit an execution key for obtaining a permission for a transition to a registration mode or an invalidation mode using a communication device other than the in-vehicle communication device in a case which the in-vehicle authentication device connected through the connector is not able to communicate with the management server using the in-vehicle communication device, wherein the registration mode is a mode in which an electronic key of the vehicle is registered in the in-vehicle authentication device, and the invalidation mode is a mode in which the electronic key registered in the in-vehicle authentication device is invalidated.

(2): In the aspect (1), after a request for requesting execution of the registration mode or the invalidation mode is output to the in-vehicle authentication device through the connector, in a case in which a notification indicating that the request is not able to be transmitted to the management server is input from the in-vehicle authentication device through the connector, the requester requests the management server to transmit the execution key.

(3): In the aspect (1), an inputter that accepts an input operation from an operator and an output controller that outputs input information input to the inputter and the execution key received from the management server using the communication device to the in-vehicle authentication device through the connector are further included.

(4): An electronic key management system according to one aspect of the present invention is an electronic key management system including: the electronic key management system assisting device of the aspect (3); the in-vehicle communication device; and the in-vehicle authentication device including an execution unit that performs first authentication based on the execution key input from the electronic key management system assisting device and the input information and executing the registration mode or the invalidation mode in a case in which the first authentication is successful.

(5): In the aspect (4), the execution unit executes a process of registration or invalidation based on key information received from the electronic key under a condition that a predetermined time has elapsed after execution of the registration mode or the invalidation mode in a case in which the registration mode or the invalidation mode is executed in accordance with the first authentication being successful.

(6): In the aspect (5), the predetermined time is longer than that in a case in which second authentication based on the input information input from the electronic key management system assisting device and the execution key received from the management server using the in-vehicle communication device is successful.

(7): In the aspect (6), the execution unit immediately executes the process of registration or invalidation based on key information received from the electronic key in a case in which the second authentication is successful before elapse of the predetermined time.

(8): In the aspect (4), the execution unit executes a process of provisional registration or provisional invalidation based on received key information in a case in which the key information is received from the electronic key during execution of the registration mode or the invalidation mode in accordance with the first authentication being successful, the electronic key management system further including a canceller that returns the state to a state before the execution of the process executed by the execution unit in a case in which a predetermined cancellation condition is satisfied after the execution of the process of the provisional registration or provisional invalidation using the execution unit.

(9): In the aspect (8), the predetermined cancellation condition includes elapse of a predetermined time after execution of the process of provisional registration or provisional invalidation.

(10): In the aspect (8), the predetermined cancellation condition includes a condition that the number of times of starting a drive source included in the vehicle after execution of the process of the provisional registration or provisional invalidation becomes equal to or greater than a threshold.

(11): In the aspect (8), the execution unit performs third authentication based on the input information input from the electronic key management system assisting device and the execution key received from the management server using the in-vehicle communication device and immediately executes a process of registration or invalidation based on key information received from the electronic key in a case in which the third authentication is successful before the cancellation condition is satisfied.

(12): A method according to one aspect of the present invention is a method using a control computer of an electronic key management system assisting device including a connector that is mounted in a vehicle and is used for a connection with an in-vehicle authentication device communicating with a management server using an in-vehicle communication device, the method including: detecting that the in-vehicle authentication device connected through the connector is not able to communicate with the management server; and requesting the management server to transmit an execution key for obtaining a permission for a transition to a registration mode or an invalidation mode using a communication device other than the in-vehicle communication device in a case in which it is detected that communication is not able to be performed, wherein the registration mode is a mode in which an electronic key of the vehicle is registered in the in-vehicle authentication device, and the invalidation mode is a mode in which the electronic key registered in the in-vehicle authentication device is invalidated.

(13): A storage medium according to one aspect of the present invention is a computer-readable non-transitory storage medium having a program stored thereon, the program causing a control computer of an electronic key management system assisting device including a connector that is mounted in a vehicle and is used for a connection with an in-vehicle authentication device communicating with a management server using an in-vehicle communication device to execute: detecting that the in-vehicle authentication device connected through the connector is not able to communicate with the management server; and requesting the management server to transmit an execution key for obtaining a permission for a transition to a registration mode or an invalidation mode using a communication device other than the in-vehicle communication device in a case in which it is detected that communication is not able to be performed, wherein the registration mode is a mode in which an electronic key of the vehicle is registered in the in-vehicle authentication device, and the invalidation mode is a mode in which the electronic key registered in the in-vehicle authentication device is invalidated.

According to the aspects (1) to (13), a remedial action can be provided in a situation in which it is difficult for an in-vehicle device to communicate with the center.

DETAILED DESCRIPTION OF THE INVENTION

Hereinafter, an electronic key management system assisting device, an electronic key management system, a method, and a storage device according to embodiments of the present invention will be described with reference to the drawings.

First Embodiment

[Entire Configuration]

Figure 1:
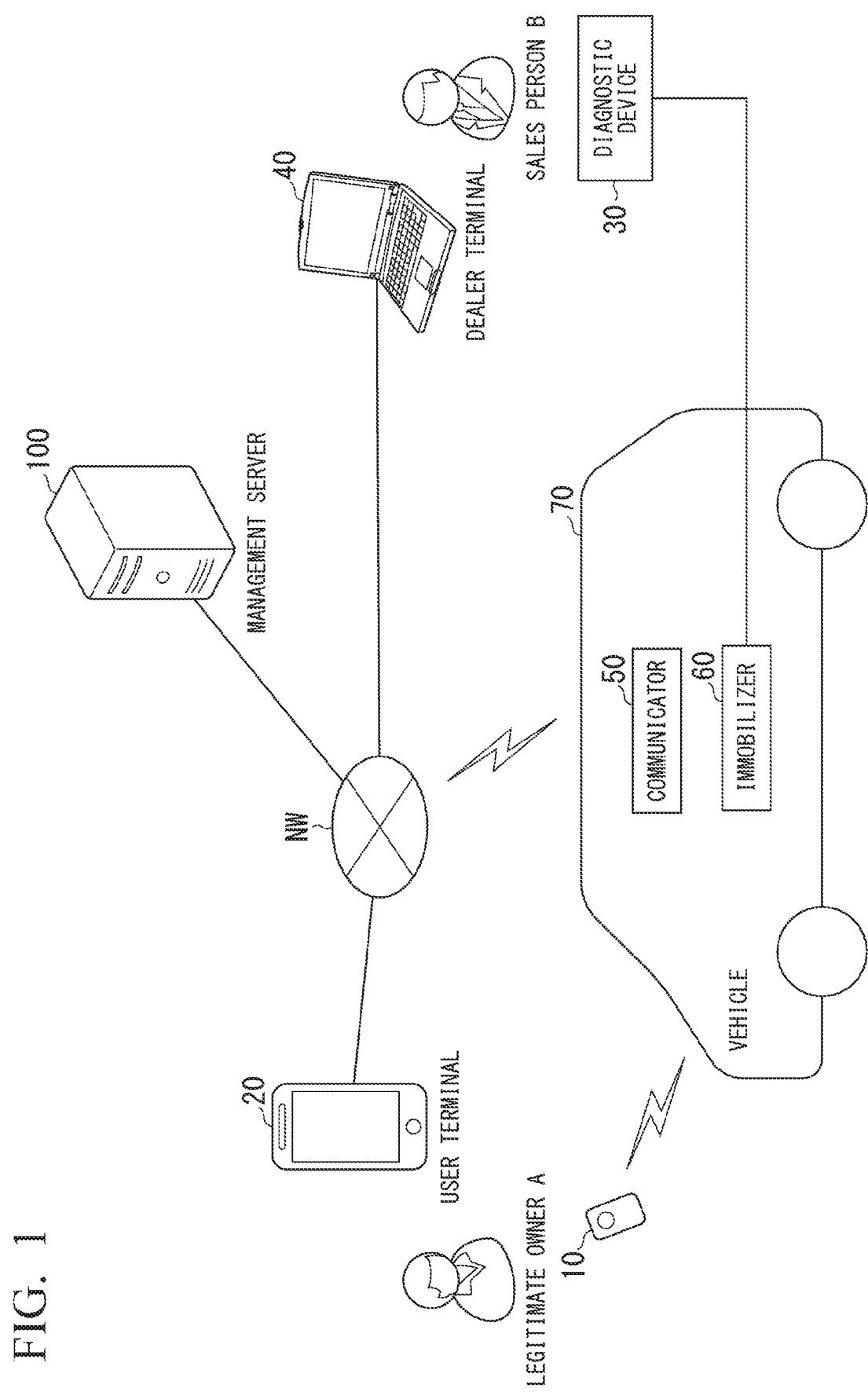
FIG. 1 is a configuration diagram of an electronic key management system according to a first embodiment.

FIG. 1 is a configuration diagram of an electronic key management system 1 according to a first embodiment. The electronic key management system 1, for example, includes an electronic key 10, a user terminal 20, a diagnostic device 30, a dealer terminal 40, a communicator 50, an immobilizer 60, and a management server 100. The user terminal 20, the dealer terminal 40, the communicator 50, and the management server 100 communicate with one another using a network NW. The network NW, for example, includes some or all of a wide area network (WAN), a local area network (LAN), the Internet, a provider device, a radio base station, a dedicated line, and the like.

The communicator 50 and the immobilizer 60 are mounted in a vehicle 70. The immobilizer 60 is one example of an in-vehicle device (in other words, an in-vehicle authentication device) that performs an authentication process. The in-vehicle authentication device may be any in-vehicle device performing an authentication process and thus may be a device other than an immobilizer.

The vehicle 70, for example, is a vehicle purchased by a legitimate owner A. A registration operation and an invalidation operation for the electronic key 10 described below are frequently performed in a dealer store at the time of delivery to a purchaser, at the time of additional registration, or at the time of cancellation of registration. However, there are cases in which the vehicle 70 cannot move from a parking place due to battery exhaustion, running out of gas, or the like. In addition, there are cases in which additional registration is performed at an owner's house or the like by the legitimate owner A. In such cases, also at places other than a dealer store, a registration operation or an invalidation operation is performed.

"At the time of additional registration" is a time when a new electronic key is registered after an electronic key is lost, a time when a new electronic key is registered for a second or subsequent time, or the like. "At the time of cancellation of registration" is a time when a registration of a lost electronic key is cancelled or the like. Hereinafter, these will be described without being distinguished from each other. A registration operation and an invalidation operation are performed by a legitimate owner A, a sales person B of a dealer store, or the like, and, hereinafter, an example in which such operations are executed by an operator including those will be described.

The electronic key 10 is an electronic key provided for being registered in the vehicle 70. Key information is stored in a storage included in the electronic key 10. The key information, for example, is identification information for identifying the electronic key 10. A predetermined switch is disposed in the electronic key 10, and the key information stored in the storage of the electronic key 10 is transmitted in accordance with an operation of the switch.

The user terminal 20 is a terminal device used by the legitimate owner A. The user terminal 20, for example, is a tablet terminal, a smartphone, a personal digital assistant (PDA), a notebook PC, or the like.

The diagnostic device 30, for example, diagnoses a malfunction or the like of a vehicle in a state in which it is connected to the immobilizer 60 using a dedicated wire cable. When connected to the immobilizer 60, the diagnostic device 30 may be indirectly connected through another ECU or be directly connected. In an embodiment, the diagnostic device 30 is used as a tool for causing the immobilizer 60 to execute a predetermined mode.

The dealer terminal 40 is a terminal device used by the sales person B of the dealer store. The dealer terminal 40, for example, is a desktop PC or a notebook PC disposed at the dealer store and may be a tablet terminal, a smartphone, a PDA, or the like.

The communicator 50, for example, is a radio communication module used for connection to the network NW through a cellular network or a Wi-Fi network. The communicator 50 is connected to the immobilizer 60 and outputs information received from an external device such as the management server 100 to the immobilizer 60.

The immobilizer 60 stores key information of an electronic key registered in a registration process for the electronic key 10 in the storage (to be described later) and performs collation of key information with the electronic key 10. More specifically, the immobilizer 60 collates registered key information with key information received from the electronic key 10 and determines matching or mismatching thereof. In a case in which matching between the key information received from the electronic key 10 and the key information stored in the storage is determined (in a case in which the electronic key 10 is authenticated as being legitimate, in other words, in a case in which authentication is successful) through this determination process, the immobilizer 60 permits a predetermined operation such as locking or release of doors of the vehicle 70, starting of an engine of the vehicle 70, or the like. On the other hand, authentication is not successful for key information received from an electronic key 10 that has not been registered.

In such a case, the immobilizer 60 does not permit a predetermined operation.

The management server 100 issues an execution key that is input to the diagnostic device 30 by the sales person B in a registration process or an invalidation process for the electronic key 10 which will be described below. Here, the execution key is information used for acquiring a permit for a transition to a registration mode or an invalidation mode. The registration mode is a mode in which an electronic key 10 is registered in the immobilizer 60 as an electronic key dedicated for the vehicle 70. The invalidation mode is a mode in which an electronic key registered in the immobilizer 60 as an electronic key dedicated for the vehicle 70 is invalidated. An operator switches the immobilizer 60 to the registration mode using this execution key and then associates the electronic key 10 and the vehicle 70 with each other. An operator switches the immobilizer 60 to the invalidation mode using the execution key and then cancels association between the electronic key 10 and the vehicle 70.

[Diagnostic device 30]

Figure 2:
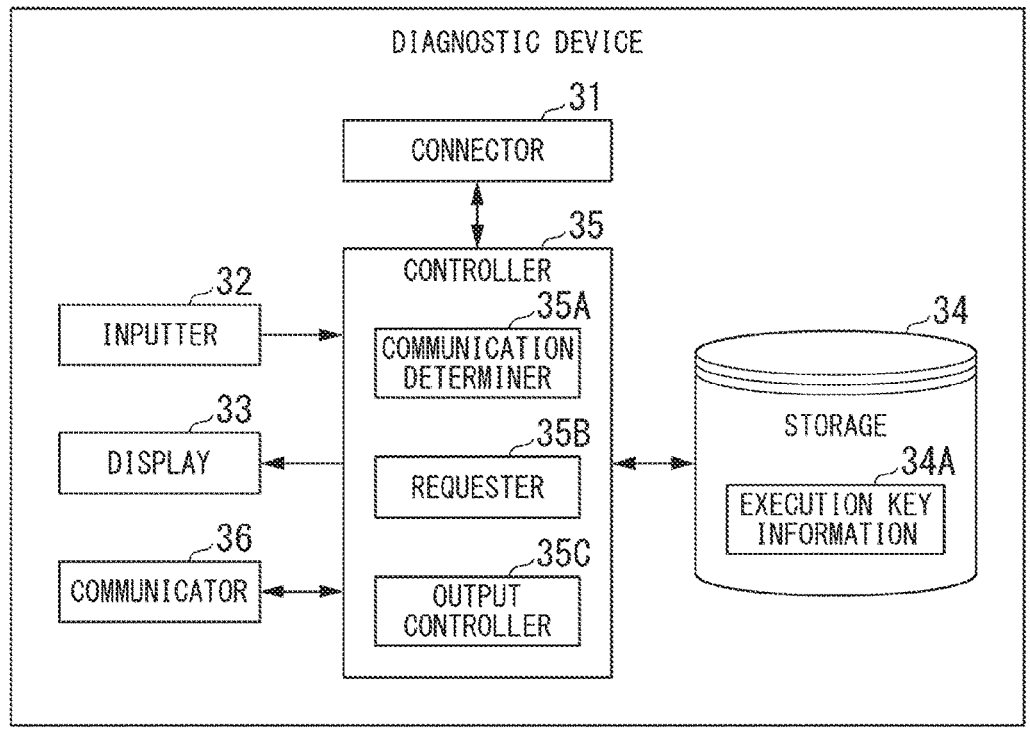
FIG. 2 is a configuration diagram of a diagnostic device.

FIG. 2 is a configuration diagram of the diagnostic device 30. As illustrated in FIG. 2, the diagnostic device 30 includes a connector 31, an inputter 32, a display 33, a storage 34, a controller 35, and a communicator 36. The connector 31 is a connector to which a wire cable is connected. The connector 31 is connected to the immobilizer 60 through a wire cable. The inputter 32 is configured as various keys, buttons, or the like. The display 33 is a liquid crystal display (LCD) or the like. The storage 34 is realized by a random access memory (RAM), a read only memory (ROM), a flash memory, or the like. In the storage 34, for example, information of execution key information 34A and the like is stored. The execution key information 34A is information representing an execution key received from the management server 100. The communicator 36, for example, is a radio communication module (a communication device) used for connection to the network NW through a cellular network or a Wi-Fi network.

The controller 35, for example, communicates with the immobilizer 60 on the basis of information input by the inputter 32 and executes a predetermined process on the basis of information received from the immobilizer 60. The controller 35 includes a communication determiner 35A, a requester 35B, and an output controller 35C. Such components, for example, are realized by a hardware processor such as a central processing unit (CPU) executing a program (software). The program may be stored in a storage device such as an HDD or a flash memory of the diagnostic device 30 in advance or may be stored on a storage medium such as a DVD or a CD-ROM that can be loaded or unloaded and installed in the HDD or the flash memory of the diagnostic device 30 by loading the storage medium into a drive device.

The communication determiner 35A determines whether or not the immobilizer 60 connected through the connector 31 can communicate with the management server 100 using the communicator 50. For example, after outputting a request for requesting execution of the registration mode or the invalidation mode (hereinafter, referred to as an execution request) to the immobilizer 60 through the connector 31, in a case in which a notification indicating that the execution request cannot be transmitted to the management server 100 is input from the immobilizer 60 within a predetermined time, the communication determiner 35A determines that the immobilizer 60 cannot communicate with the management server 100 using the communicator 50. In a case in which it is determined by the communication determiner 35A that the immobilizer 60 cannot communicate with the management server 100 using the communicator 50, the controller 35 executes a process when it is difficult to perform communication. Details of the process executed when it is difficult to perform communication will be described later. For example, in a case in which the registration mode or the like is requested in a situation in which the vehicle 70 cannot move from a place at which a communication environment for communicating with a network is not good such as an underground parking lot, the process executed when it is difficult to perform communication is executed.

In a case in which it is determined by the communication determiner 35A that the immobilizer 60 cannot communicate with the management server 100 using the communicator 50, the requester 35B requests the management server 100 to transmit an execution key. For example, the requester 35B transmits an execution request of a designated mode to the management server 100 using the communicator 36.

The output controller 35C outputs input information input to the inputter 32 to the immobilizer 60 through the connector 31. In a case in which an execution key is requested from the requester 35B, the output controller 35C also outputs the execution key received from the management server 100 using the communicator 36 to the immobilizer 60 through the connector 31 in addition to the input information input to the inputter 32.

The output controller 35C displays a predetermined screen on the display 33 on the basis of various kinds of information stored in the storage 34.

[Management server 100]

Figure 3:
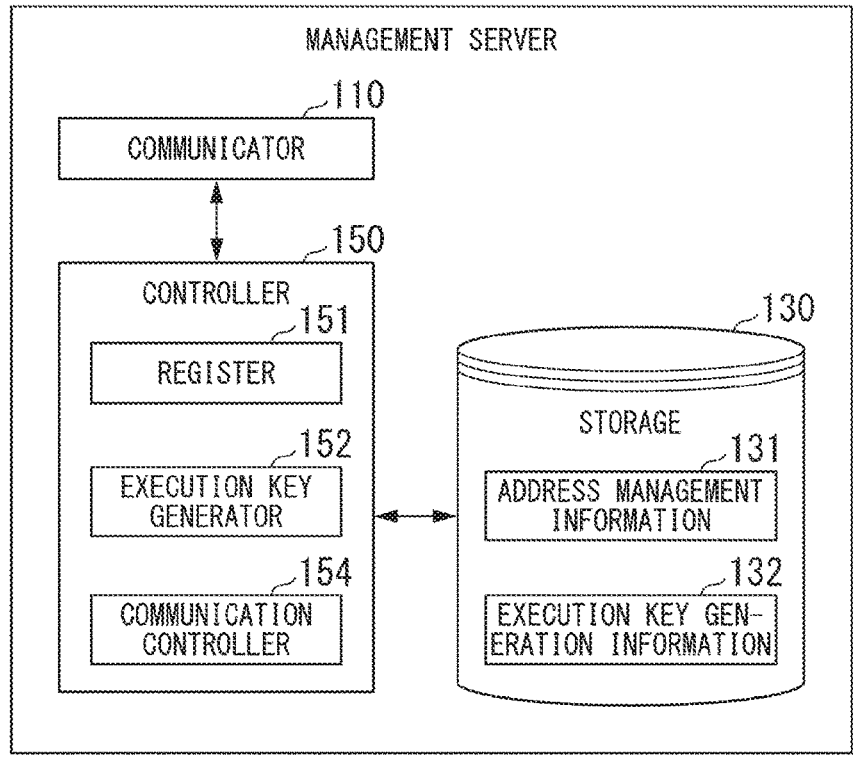
FIG. 3 is a configuration diagram of a management server.

Before the immobilizer 60, the management server 100 will be described first. FIG. 3 is a configuration diagram of the management server 100. As illustrated in FIG. 3, the management server 100 includes a communicator 110, a storage 130, and a controller 150. The communicator 110, for example, includes a communication interface such as a network interface card (NIC) or the like. The storage 130 is a RAM, a ROM, a flash memory such as a solid state drive (SSD), a hard disk drive (HDD), or the like. In the storage 130, for example, information such as address management information 131, execution key generation information 132, and the like are stored. The execution key generation information 132 is information that is necessary for generating an execution key. For example, the execution key generation information 132 includes a calculation equation, a program, and the like for deriving an execution key on the basis of input information.

Figures 4, 5:
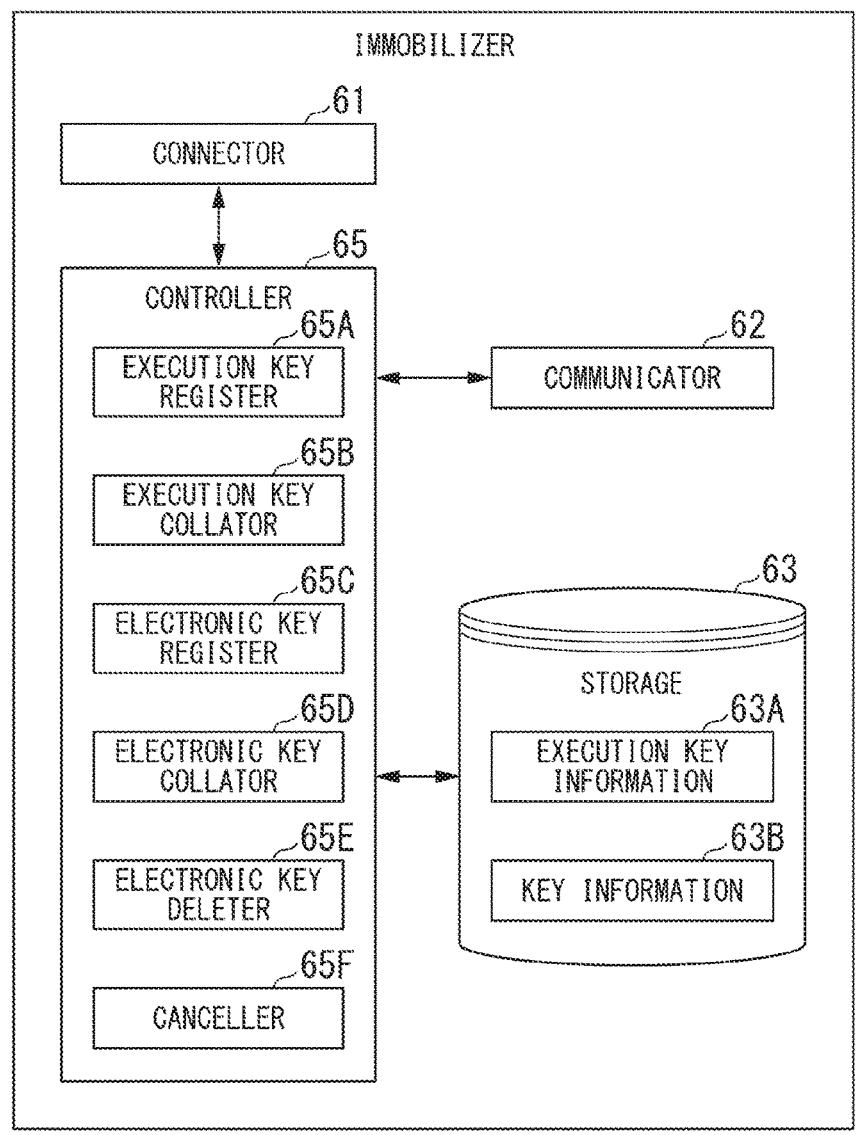
FIG. 4 is a diagram illustrating one example of details of address management information.
FIG. 5 is a configuration diagram of an immobilizer.

FIG. 4 is a diagram illustrating one example of details of the address management information 131. As illustrated in FIG. 4, the address management information 131, for example, is information in which a dealer mail address, a user mail address, and an execution key are associated with a vehicle body number. The vehicle body number is identification information used for identifying each vehicle 70 and, for example, is a number displayed in a registration number plate mounted (or to be mounted) in the vehicle 70. The dealer mail address is a mail address at which a mail can be received using the dealer terminal 40. The user mail address is a mail address at which a mail can be received using the user terminal 20. The execution key, for example, is an execution key generated by the management server 100 on the basis of a corresponding vehicle body number or the like. The dealer mail address or the user mail address is one example of an address used when information is transmitted to the dealer terminal 40 or the user terminal 20 and is not particularly limited to a mail address as long as it can be used for transmitting and receiving an execution key.

The controller 150, for example, includes a register 151, an execution key generator 152, and a communication controller 154. Such components, for example, are realized when a hardware processor such as a CPU executes a program (software). The program may be stored in a storage device such as an HDD or a flash memory of the management server 100 in advance or may be stored in a storage medium such as a DVD or a CD-ROM that can be loaded or unloaded and be installed in an HDD or a flash memory of the management server 100 by loading the storage medium into a drive device.

The register 151 stores information in which a dealer mail address received from the dealer terminal 40 and a user mail address received from the user terminal 20 are associated with a vehicle body number received from the dealer terminal 40 in the storage 130 as a part of the address management information 131. A mail address associated with each vehicle body number in the address management information 131 may be any one of a dealer mail address and a user mail address.

The execution key generator 152, for example, generates an execution key K using the execution key generation information 132 in response to an execution request from the immobilizer 60 (the diagnostic device 30 when it is difficult to perform communication).

For example, the execution key generator 152 generates an execution key K using the execution key generation information 132 on the basis of static information such as a vehicle body number registered in the address management information 131 or dynamic information such as date and time information of registration. The execution key generator 152 stores the generated execution key K in the storage 130 in association with the corresponding vehicle body number.

The communication controller 154 transmits the execution key K generated by the execution key generator 152 to the immobilizer 60 (or the diagnostic device 30) that has transmitted the execution request. Hereinafter, the execution key K transmitted to the immobilizer 60 will be referred to as an execution key Ki. In addition, an execution key transmitted to the diagnostic device 30 will be referred to as an execution key Kd. The execution key Ki and the execution key Kd have the same information as the execution key K.

The communication controller 154 transmits an execution key K generated by the execution key generator 152 to at least one of the dealer terminal 40 and the user terminal 20. Hereinafter, the execution key K transmitted to at least one of the dealer terminal 40 and the user terminal 20 will be referred to as an execution key Kt. The execution key Kt has the same information as the execution key K. The dealer terminal 40 or the user terminal 20 displays the received execution key Kt on its own display. Hereinafter, an execution key that is input to the inputter 32 by an operator by referring to this display and is input from the diagnostic device 30 to the immobilizer 60 will be referred to as an execution key Kt(m).

[Immobilizer 60]

FIG. 5 is a configuration diagram of the immobilizer 60. As illustrated in FIG. 5, the immobilizer 60 includes a connector 61, a storage 63, and a controller 65. The connector 61 is a connector to which a wire cable is connected. The connector 61 is connected to the diagnostic device 30 and the communicator 50 through the wire cable. The storage 63 is realized by a RAM, a ROM, a flash memory, or the like.

In the storage 63, for example, information such as execution key information 63A and key information 63B is stored. The execution key information 63A is information representing an execution key Ki received from the management server 100. The key information 63B is identification information assigned to an electronic key 10 registered as an electronic key dedicatedly used for the vehicle 70 (in other words, the immobilizer 60) in the registration mode. A plurality of pieces of key information may be included in the key information 63B.

The controller 65, for example, includes an execution key register 65A, an execution key collator 65B, an electronic key register 65C, an electronic key collator 65D, an electronic key deleter 65E, and a canceller 65F. Such components, for example are realized by a hardware processor such as a CPU executing a program (software). The program may be stored in a storage device such as an HDD or a flash memory of the immobilizer 60 in advance or may be stored on a storage medium such as a DVD or a CD-ROM that can be loaded or unloaded and installed in the HDD or the flash memory of the immobilizer 60 by loading the storage medium into a drive device.

In a case in which a request for execution of the registration mode is input from the diagnostic device 30 or in a case in which a request for execution of the invalidation mode is input from the diagnostic device 30, the execution key register 65A transmits input information to the management server 100. In a case in which an execution key Ki is received from the management server 100, the execution key register 65A stores the received execution key in the storage 63 as execution key information 63A. Meanwhile, in a case in which an execution request cannot be transmitted to the management server 100, the execution key register 65A outputs a notification indicating that to the diagnostic device 30. Also in a case in which an execution key Ki has not been received from the management server 100 within a predetermined time after transmission of an execution request to the management server 100, the execution key register 65A may output a notification representing that the request could not be transmitted to the management server 100 to the diagnostic device 30.

The execution key collator 65B, for example, executes an authentication process (hereinafter, referred to as an authentication process P) of collating an execution key Kt(m) input from the diagnostic device 30 to the immobilizer 60 with an execution key Ki that is execution key information 63A stored in the storage 63. In the authentication process P, the execution key collator 65B determines whether or not the execution key Kt(m) and the execution key Ki match each other. Here, keys matching each other, in addition to information represented by the keys matching each other or partly matching each other, may include various meanings including a case in which correct information is acquired in a case in which information encrypted using one key is decoded using the other key and the like. This is similar in the following description.

The execution key collator 65B executes an authentication process (hereinafter, referred to as an authentication process Q) of collating an execution key Kd input from the diagnostic device 30 to the immobilizer 60 (an execution key transmitted from the management server 100 to the diagnostic device 30) with an execution key Kt(m). The execution key collator 65B determines whether or not the execution key Kd and the execution key Kt(m) match each other in the authentication process Q. This authentication process Q is a part of the process executed when it is difficult to perform communication.

In any one of the authentication processes described above, in a case in which collation targets match each other, the execution key collator 65B authenticates that the execution key Kt(m) input from the diagnostic device 30 to the immobilizer 60 is legitimate (in other words, determines that the authentication is successful). On the other hand, in a case in which it is determined that the collation targets do not match each other, the execution key collator 65B does not authenticate that the execution key Kt(m) input from the diagnostic device 30 to the immobilizer 60 is legitimate (in other words, determines that the authentication is not successful).

The electronic key register 65C is an execution unit that causes the process to transition to the registration mode and executes a registration process. In a case in which the execution key Kt(m) is authenticated by the execution key collator 65B as legitimate, the electronic key register 65C executes a registration mode in response to the execution request of the registration mode. The execution request of the registration mode may be performed either before authentication or after the authentication.

In a case in which the authentication process Q is successful, in other words, in a case in which the immobilizer 60 could communicate with the management server 100 using the communicator 50, the electronic key register 65C executes the following process. For example, in a case in which key information is received from the electronic key 10 during the execution of the registration mode, the electronic key register 65C stores the received key information in the storage 63 as key information 63B and ends the registration mode.

In a case in which key information is received from the vehicle key 10, the electronic key collator 65D collates the received key information with the key information 63B stored in the storage 63. The electronic key collator 65D determines whether or not the pieces of key information match each other through collation and authenticates the key information received from the vehicle key 10 as legitimate in the case of matching. In a case in which the key information received from the vehicle key 10 is authenticated as legitimate, the electronic key collator 65D permits a predetermined operation such as locking or release of doors of the vehicle 70, starting of the engine of the vehicle 70, or the like. On the other hand, in a case in which the pieces of key information do not match each other through collation, the electronic key collator 65D does not authenticate the key information received from the vehicle key 10 as legitimate and does not permit a predetermined operation.

The electronic key deleter 65E is an execution unit that causes the process to transition to the invalidation mode and executes an invalidation process. In a case in which the execution key Kt(m) is authenticated by the execution key collator 65B as legitimate, the electronic key deleter 65E executes the invalidation mode in response to an execution request of the invalidation mode. The execution request of the invalidation mode may be performed either before authentication or after authentication. In a case in which the authentication process Q is successful, in other words, in a case in which the immobilizer 60 could communicate with the management server 100 using the communicator 50, the electronic key deleter 65E executes the following process. For example, in a case in which key information is received from the electronic key 10 during the execution of the invalidation mode, the electronic key deleter 65E determines whether or not the received key information is stored in the storage 63 as the key information 63B. In a case in which the key information received from the electronic key 10 is stored in the storage 63 as the key information 63B, the electronic key deleter 65E deletes the key information received from the electronic key 10 from the storage 63 and ends the invalidation mode.

In a case in which the authentication process Q is not successful (in other words, in a case in which the immobilizer 60 cannot communicate with the management server 100 using the communicator 50), the electronic key register 65C and the electronic key deleter 65E execute a conditional registration mode or a conditional invalidation mode. In the conditional registration mode or the conditional invalidation mode, a predetermined restriction is applied to the process executed after the authentication process P is successful. Conditions, for example, include a condition (1) in which key information cannot be registered (or cancelled) until a predetermined time has elapsed after a predetermined mode is executed, a condition (2) in which key information is temporarily registered (cancelled), and thereafter the state is returned to the original state (a state before the registration or the cancellation), and the like. By employing the condition (1), registration (or cancellation) cannot be immediately executed, and accordingly, there is a high likelihood that an illegitimate operator will give up the registration, whereby the security of the vehicle 70 can be improved. By employing the condition (2), a temporary mode can be used, and accordingly, a process desired by a legitimate operator can be realized, and wrong use of an illegitimate user is restricted by not allowing continuous use in the mode. As a result, the security of the vehicle 70 can be improved.

One example of the condition (2) will be described. In a case in which key information is received from the electronic key 10 during execution of a predetermined mode according to a success of the authentication process Q, the electronic key register 65C or the electronic key deleter 65E executes a provisional registration process or a provisional invalidation process based on the received key information.

Here, the provisional registration is temporary registration of key information. In addition, the provisional invalidation is temporary deletion of key information. In the provisional invalidation, key information that has temporarily been deleted is stored in the storage 63 so that it can be registered again. The conditional registration mode will be described in detail later.

In a case in which a predetermined cancellation condition is satisfied during execution of the process of provisional registration using the electronic key register 65C (or the process of provisional invalidation using the electronic key deleter 65E), the canceller 65F returns the state to the state before the execution of the process executed by the electronic key register 65C or the electronic key deleter 65E. For example, in a case in which a cancellation condition is satisfied, the canceller 65F deletes the key information that has temporarily been registered by the electronic key register 65C from the storage 63. In a case in which the cancellation condition is satisfied, the canceller 65F revives the key information that has temporarily been deleted by the electronic key deleter 65E in the execution key information 63A of the storage 63.

In the cancellation condition, for example, (A) elapse of a predetermined time after execution of the process of provisional registration or provisional invalidation, (B) the number of times of starting a drive source included in the vehicle 70 after execution of the process of provisional registration or provisional invalidation being equal to or greater than a threshold, (C) a running distance becoming equal to or longer than a predetermined value, and the like (for example, a threshold of the running distance is set as a distance to a close sales store), and the like are included. In a case in which it is determined that a user other than a user who has completed registration in advance uses the vehicle 70 using biological information acquired by a detection unit disposed in the vehicle 70, the canceller 65 may determine that the cancellation condition is satisfied. In the biological information, for example, a fingerprint, an iris in the pupil, and the like are included. For example, in a case in which a fingerprint of an owner of the vehicle 70 is registered in advance, and a person having a fingerprint not matching the fingerprint of the owner comes into contact with an outer handle, the canceller 65F may determine that the cancellation condition is satisfied on the basis of the biological information supplied from a detection unit mounted in the outer handle.

[Sequence Diagram]

Figure 6:
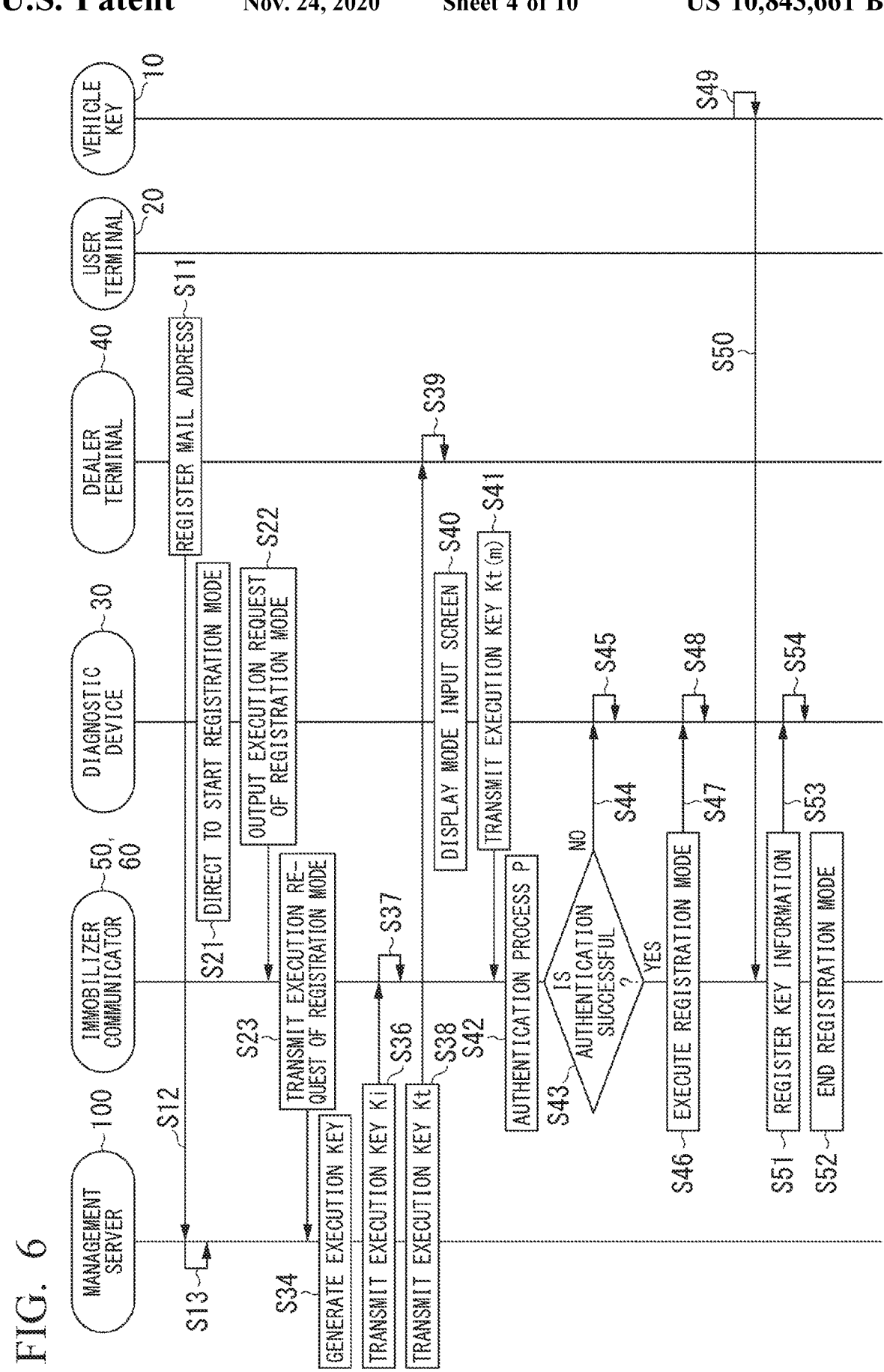
FIG. 6 is a sequence diagram illustrating the flow of a process in a case in which an immobilizer can communicate with a management server using a communicator.
Figure 7:
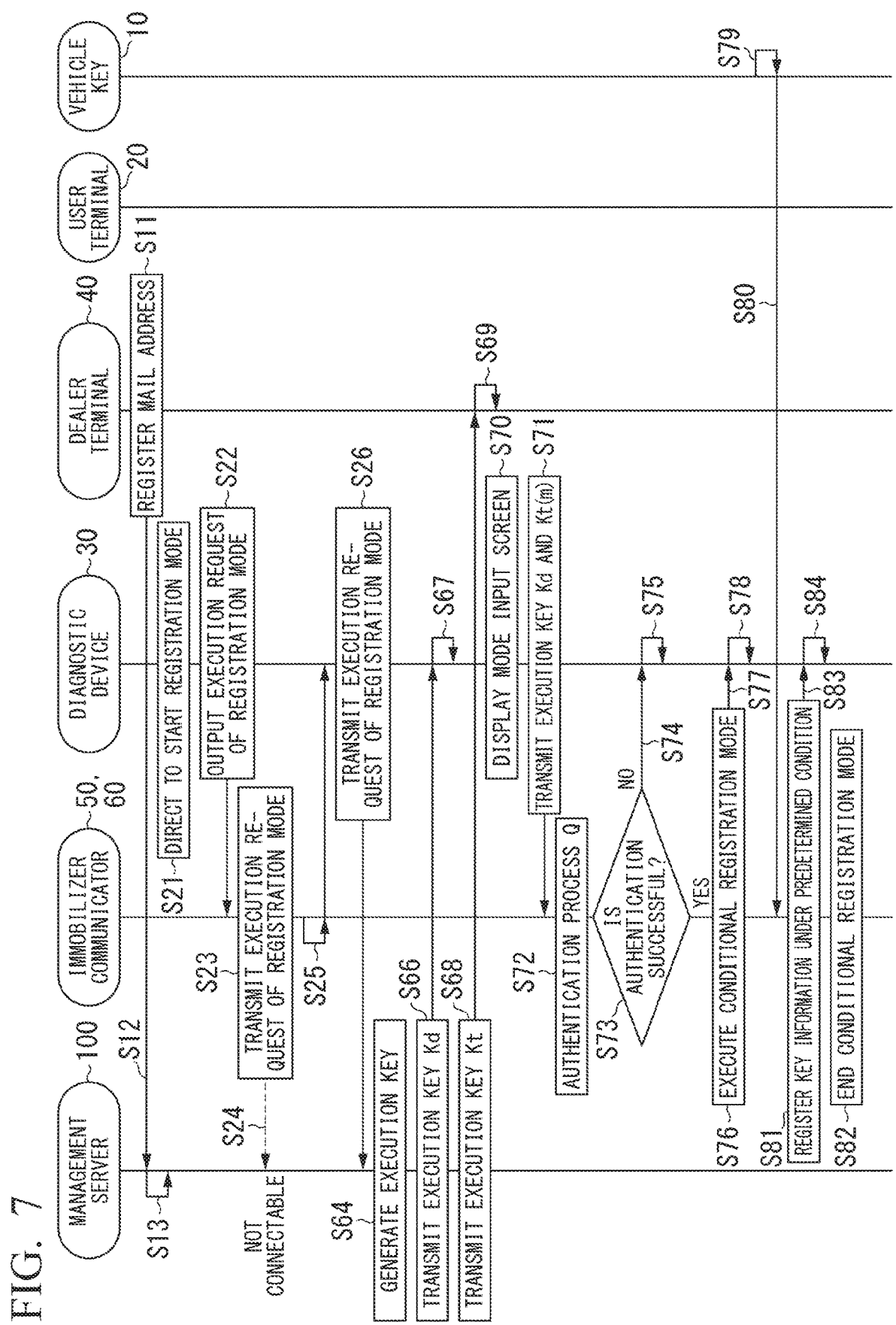
FIG. 7 is a sequence diagram illustrating the flow of a process in a case in which an immobilizer cannot communicate with a management server using a communicator.

Next, the process executed by the electronic key management system 1 will be described with reference to FIGS. 6 and 7. FIG. 6 is a sequence diagram illustrating the flow of a process in a case in which the immobilizer 60 can communicate with the management server 100 using the communicator 50. FIG. 7 is a sequence diagram illustrating the flow of a process in a case in which the immobilizer 60 cannot communicate with the management server 100 using the communicator 50. Hereinafter, an example in which a registration mode is executed will be described. For the invalidation mode, the process of the electronic key register 65C described below may be replaced with the process of the electronic key deleter 65E. Although an example in which a sales person B executes the registration mode will be described, the following process may be executed by a legitimate owner A.

First, description will be presented with reference to FIG. 6. For example, the sales person B performs an operation of registering a dealer mail address in the management server 100 by operating the dealer terminal 40 (Step S11). In this way, the dealer terminal 40 transmits the input dealer mail address to the management server 100 (Step S12). The management server 100 stores the received dealer mail address in the storage 130 (Step S13). In addition, the legitimate owner A, similarly, may register a user mail address in the management server 100 in advance by transmitting the user mail address from the user terminal 40 to the management server 100.

Next, the sales person B directs start of execution of the registration mode by operating the diagnostic device 30 (Step S21). Here, the sales person B inputs a vehicle body number. When the direction for starting execution of the registration mode is received, the diagnostic device 30 outputs an execution request of the registration mode to the immobilizer 60 together with a vehicle body number (Step S22). In a case in which the execution request is input, the immobilizer 60 transmits the execution request to the management server 100 through the communicator 50 together with the vehicle body number (Step S23). In a case in which the execution request is received, the management server 100 generates an execution key K on the basis of the vehicle body number, date and time information, and the like (Step S34).

The management server 100 transmits an execution key Ki that is the execution key K generated in Step S34 to the immobilizer 60 through the communicator 50 (Step S36).

The immobilizer 60 stores the received execution key Ki in the storage 63 as execution key information 63A (Step S37).

The management server 100 transmits an execution key Kt that is the execution key K generated in Step S34 to the dealer terminal 40 (Step S38). The dealer terminal 40 displays the received execution key Kt on its own display (Step S39).

Next, the diagnostic device 30 displays an input screen accepting input of an execution key (hereinafter, referred to as an execution key input screen) on the display 33 (Step S40). On the execution key input screen, an input field of information that is information other than the execution key and is necessary for authentication may be disposed. The diagnostic device 30 outputs the execution key Kt(m) input to the inputter 32 by an operator to the immobilizer 60 (Step S41).

The immobilizer 60 executes an authentication process P on the basis of the execution key Kt(m) input from the diagnostic device 30 and the execution key Ki that is the execution key information 63A stored in Step S37 (Step S42). In a case in which authentication is not successful in the authentication process P (Step S43), the immobilizer 60 transmits information indicating that the authentication is not successful to the diagnostic device 30 (Step S44), and the diagnostic device 30 displays a screen indicating that the authentication is not successful on the display 33 on the basis of information received from the immobilizer 60 (Step S45).

On the other hand, in a case in which the authentication is successful in Step S43, the immobilizer 60 executes the registration mode (Step S46) and transmits information indicating that the registration mode is in the middle of execution (or that the authentication of the execution key is successful) to the diagnostic device 30 (Step S47). The diagnostic device 30 displays a screen indicating that the registration mode is in the middle of execution (or that the authentication of the execution key is successful) on the display 33 on the basis of the received information (Step S48).

The sales person B who has checked the screen displayed in Step S48 operates a switch of the vehicle key 10 (Step S49). The vehicle key 10 accepts an operation from the sales person B and transmits key information stored therein (Step S50). When key information is received from the vehicle key 10, the immobilizer 60 stores the received key information in the storage 63 as key information 63B (Step S51) and ends the registration mode (Step S52). Next, the immobilizer 60 transmits information indicating that the key information has been registered to the diagnostic device 30 (Step S53), and the diagnostic device 30 displays information received from the immobilizer 60 on the display 33 (Step S54).

Next, description will be presented with reference to FIG. 7. The same reference signs will be assigned to processes the same as those of the processes illustrated in FIG. 6, description thereof will not be presented, and only different processes will be described.

In Step S23, in a case in which the execution request cannot be transmitted to the management server 100 (Step S24), the immobilizer 60 outputs a notification indicating that the execution request cannot be transmitted to the management server 100 to the diagnostic device 30 (Step S25). The diagnostic device 30 transmits an execution request of the registration mode to the management server 100 using the communicator 36 (Step S26).

In a case in which the execution request is received, the management server 100 generates an execution key K on the basis of the vehicle body number, the date and time information, and the like (Step S64). The management server 100 transmits an execution key Kd that is the execution key K generated in Step S64 to the diagnostic device 30 (Step S66). The diagnostic device 30 stores the received execution key Kd in the storage 34 as the execution key information 34A (Step S67).

The management server 100 transmits an execution key Kt that is the execution key K generated in Step S64 to the dealer terminal 40 (Step S68). The dealer terminal 40 displays the received execution key Kt on its own display (Step S69).

Next, the diagnostic device 30 displays an execution key input screen on the display 33 (Step S70). The diagnostic device 30 outputs the execution key Kd received from the management server 100 using the communicator 36 and the execution key Kt(m) input to the inputter by the operator to the immobilizer 60 (Step S71). The immobilizer 60 executes an authentication process Q on the basis of the execution key Kd and the execution key Kt(m) that have been input (Step S72). In a case in which authentication is not successful in the authentication process Q (Step S73), the immobilizer 60 transmits information indicating that the authentication is not successful to the diagnostic device 30 (Step S74), and the diagnostic device 30 displays a screen indicating that the authentication is not successful on the display 33 on the basis of the received information (Step S75).

On the other hand, in a case in which authentication is successful in Step S73, the immobilizer 60 executes a conditional registration mode (Step S76) and transmits information indicating that the registration mode is in the middle of execution (or authentication of the execution key is successful) to the diagnostic device 30 (Step S77). The diagnostic device 30 displays a screen indicating that the registration mode is in the middle of execution (or authentication of the execution key is successful) on the display 33 on the basis of the information received from the immobilizer 60 (Step S78). Here, in the diagnostic device 30, it may be displayed that the mode is a conditional registration mode on the display 33.

In a case in which the screen displayed in Step S78 is checked, the sales person B operates a switch of the vehicle key 10 (Step S79). The vehicle key 10 accepts an operation from the sales person B and transmits key information stored therein (Step S80). When key information is received from the vehicle key 10, under a predetermined condition, the immobilizer 60 stores the received key information in the storage 63 as key information 63B (Step S81) and ends the conditional registration mode (Step S82).

Next, the immobilizer 60 transmits information indicating that the key information has been registered to the diagnostic device 30 (Step S83), and the diagnostic device 30 displays the received information on the display 33 (Step S84).

[Flowchart]

Figure 8:
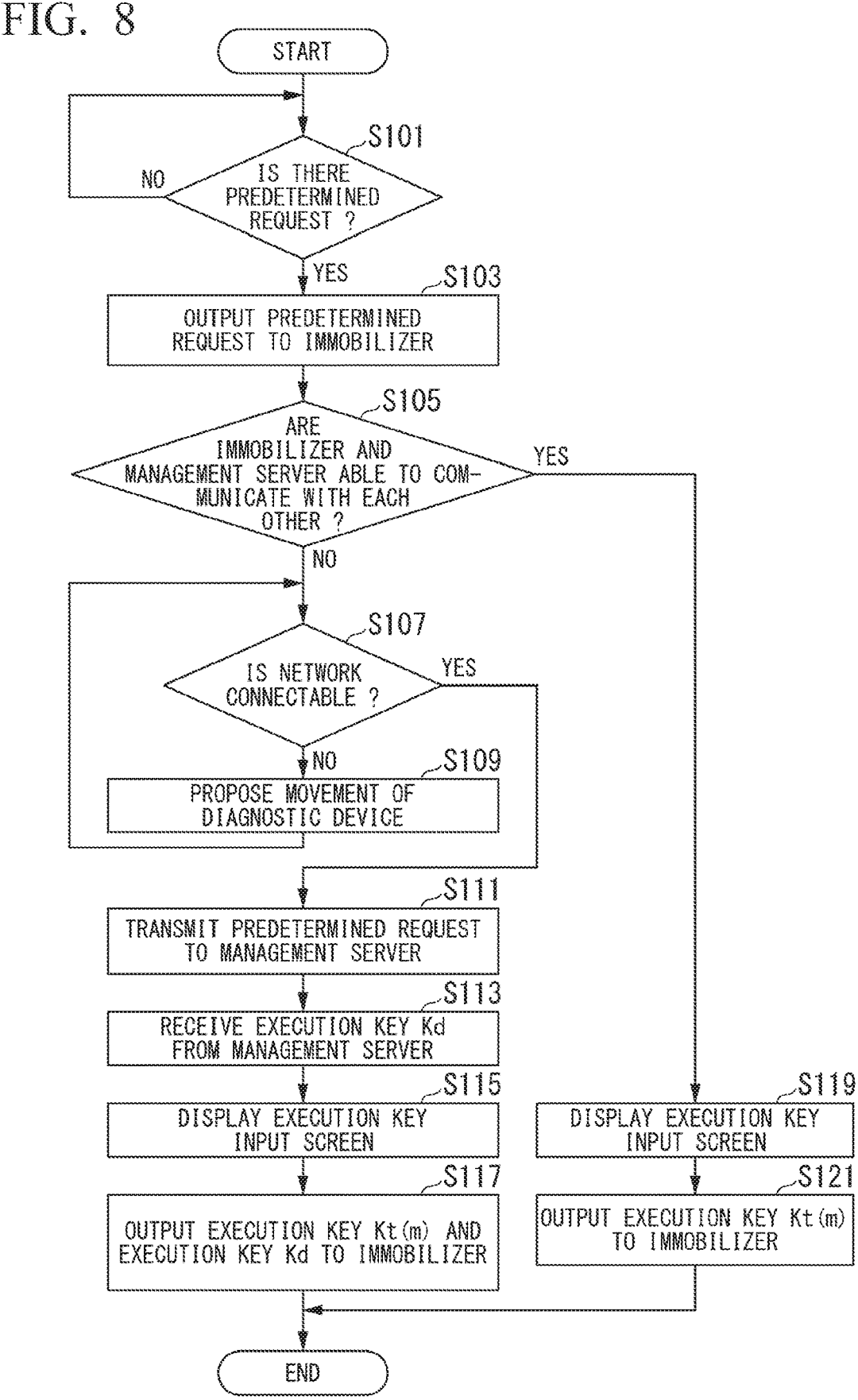
FIG. 8 is a flowchart illustrating the flow of a process performed by a diagnostic device.

FIG. 8 is a flowchart illustrating the flow of a process performed by the diagnostic device 30. As illustrated in FIG. 8, the controller 35 of the diagnostic device 30, for example, determines whether or not an execution request of the registration mode has been input by an operator using the inputter 32 (Step S101). In a case in which an execution request has been input by the operator, the input execution request is output to the immobilizer 60 through the connector 31 (Step S103).

Next, the communication determiner 35A determines whether or not the immobilizer 60 can communicate with the management server 100 using the communicator 50 (Step S105). In a case in which it is determined that the immobilizer 60 cannot communicate with the management server 100 using the communicator 50, the communication determiner 35A determines whether or not communication with the management server 100 can be performed using the communicator 36 (Step S107). In a case in which communication with the management server 100 cannot be performed using the communicator 36, the communication determiner 35A displays information indicating movement to a place at which communication with the management server 100 can be performed through the network NW on the display 33 (Step S109). In this way, the operator cancels connection between the diagnostic device 30 and the immobilizer 60 and can move to a place at which communication with the network NW can be performed with only the diagnostic device 30 held.

In a case in which communication with the management server 100 can be performed through the network NW, the requester 35B requests the management server 100 to transmit an execution key (Step S111). Next, the requester 35B stores the execution key Kd received from the management server 100 in the storage 34 as the execution key information 34A (Step S113). Then, the output controller 35C displays an execution key input screen on the display 33 (Step S115). The output controller 35C outputs the execution key Kt(m) input to the execution key input screen and the execution key Kd stored in the storage 34 in Step S113 to the immobilizer 60 through the connector 31 (Step S117).

On the other hand, in Step S105, in a case in which it is determined that the immobilizer 60 can communicate with the management server 100 using the communicator 50, the output controller 35C displays an execution key input screen on the display 33 (Step S119). Then, the output controller 35C outputs an execution key Kt(m) input to the execution key input screen to the immobilizer 60 through the connector 31 (Step S121).

Figure 10:
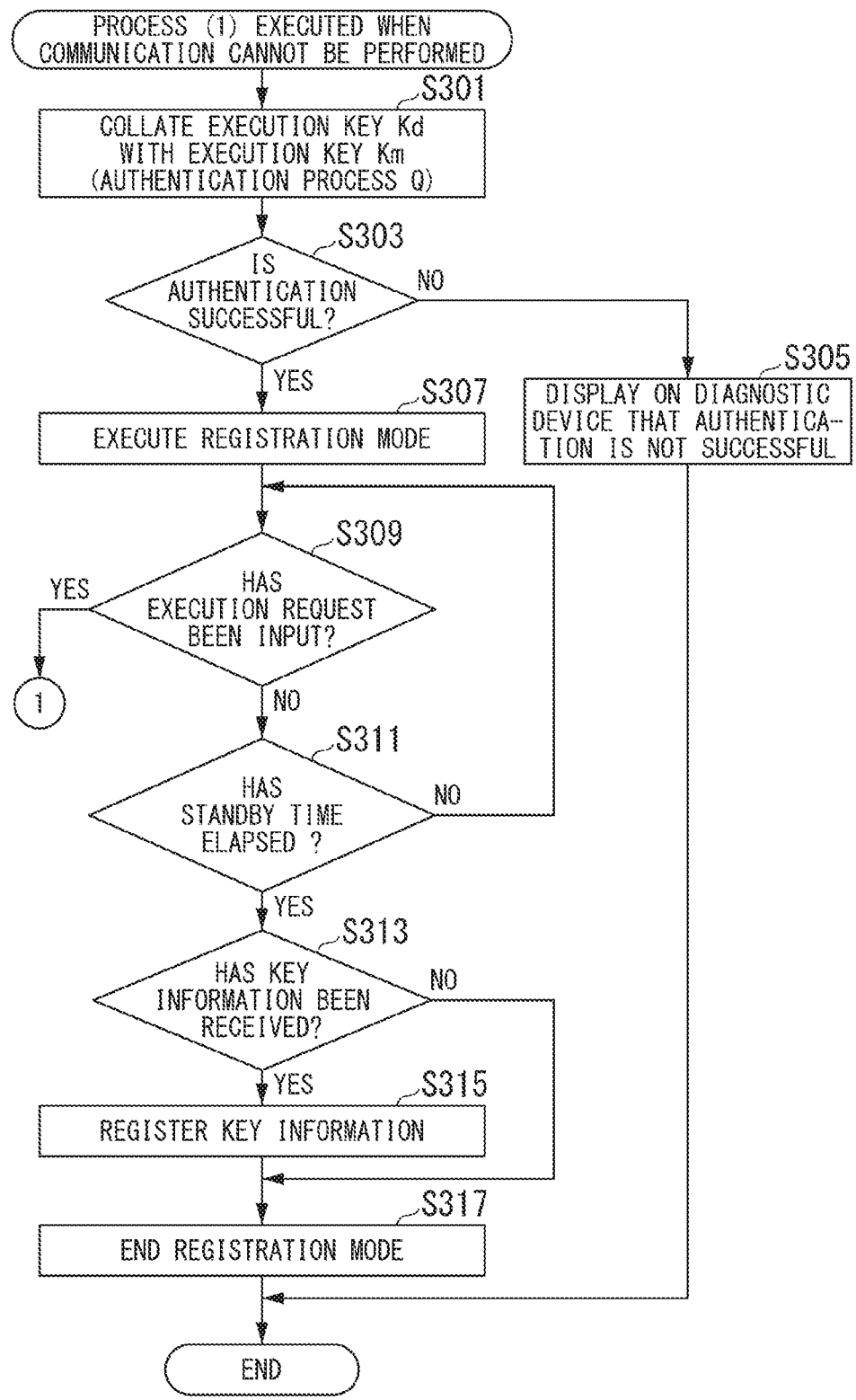
FIG. 10 is a flowchart illustrating one example of the flow of a process (1) executed when it is difficult to perform communication.
Figure 11:
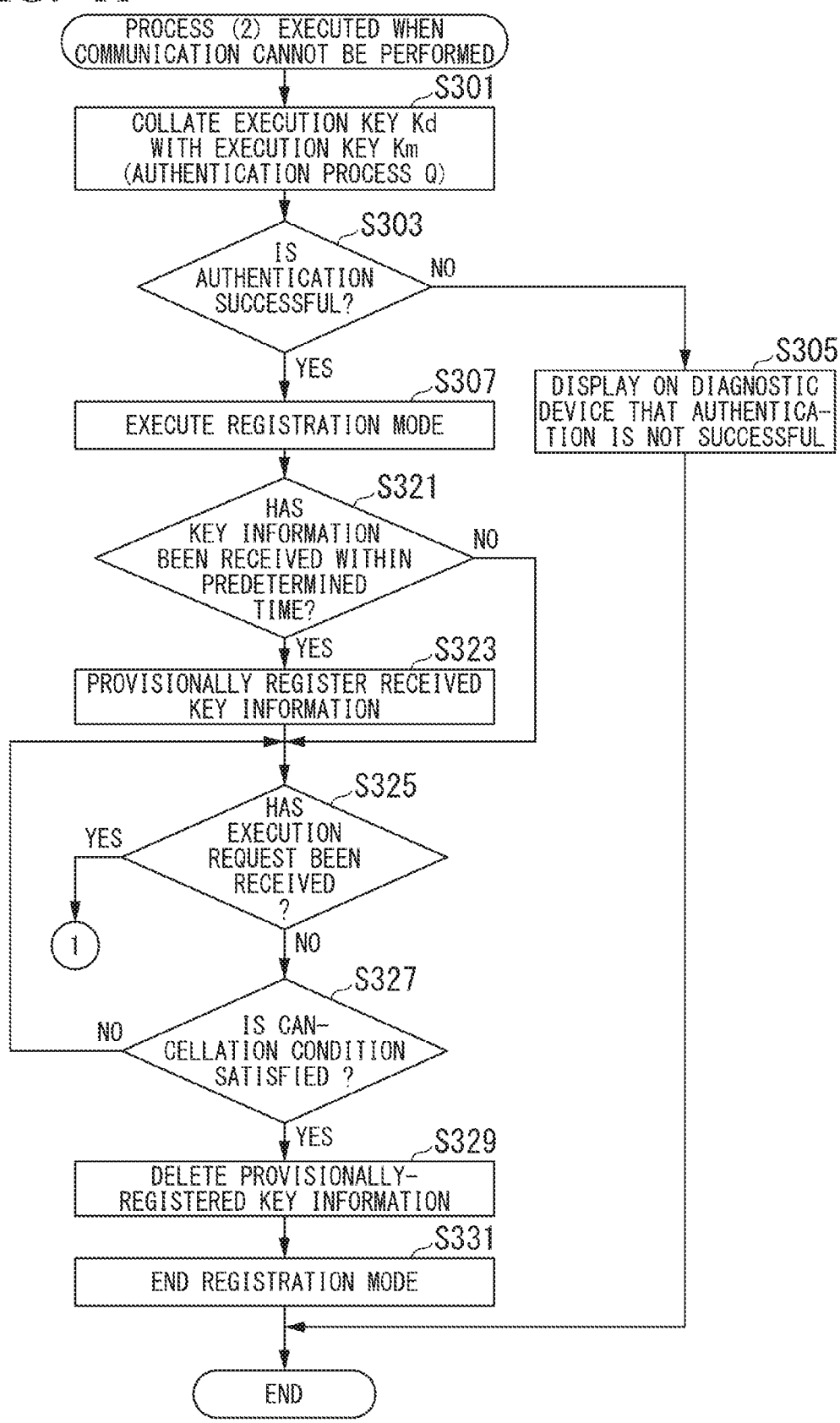
FIG. 11 is a flowchart illustrating one example of the flow of a process (2) executed when it is difficult to perform communication.

Next, the process executed by the immobilizer 60 will be described with reference to FIGS. 9 to 11. Hereinafter, an example in which an execution request of the registration mode is input from the diagnostic device 30 will be described. In a case in which an execution request of the invalidation mode is input, the process of the electronic key register 65C described below may be replaced with the process of the electronic key deleter 65E.

Figure 9:
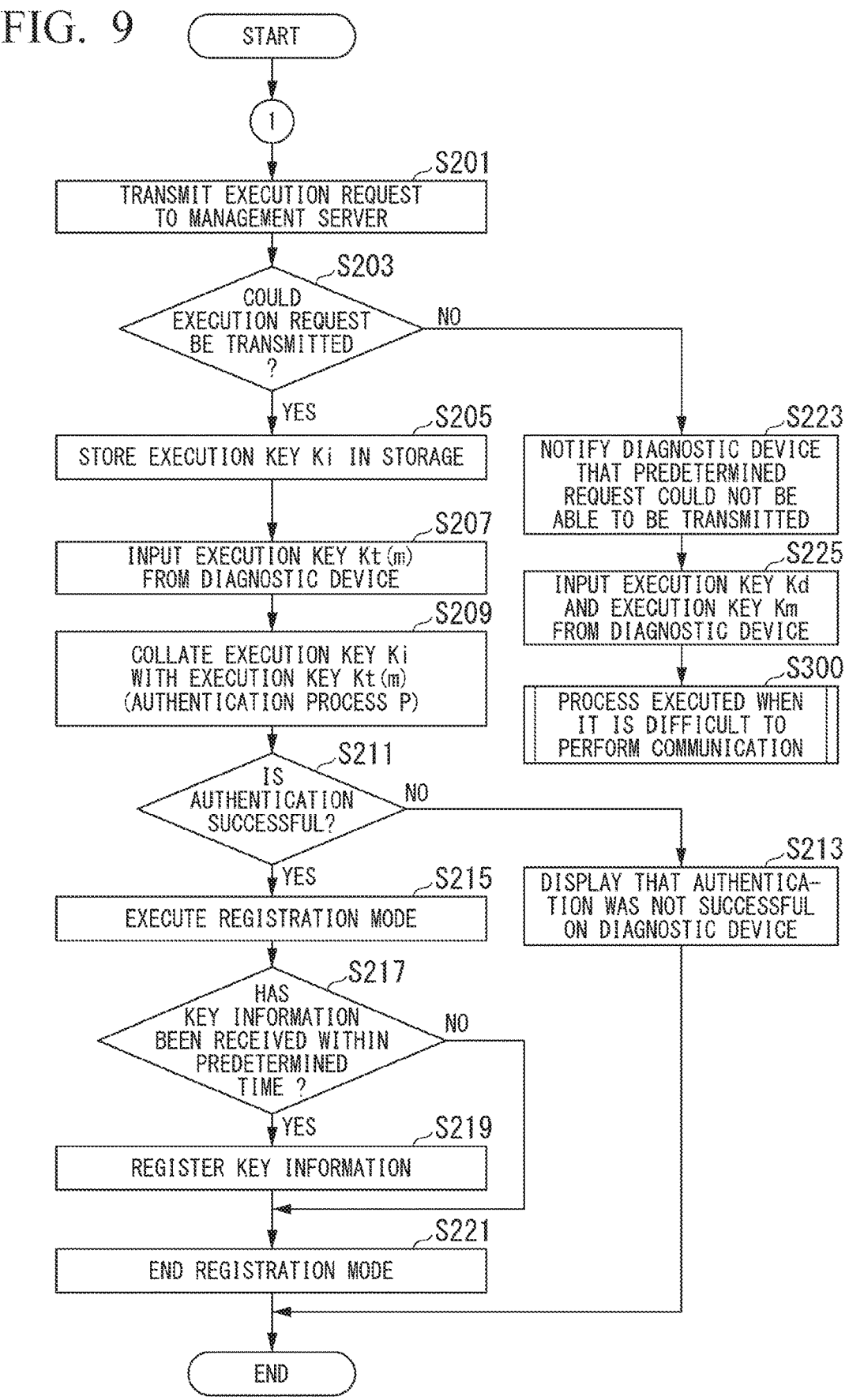
FIG. 9 is a flowchart illustrating the flow of a process performed by an immobilizer.

FIG. 9 is a flowchart illustrating the flow of a process performed by the immobilizer 60. As illustrated in FIG. 9, the execution key register 65A transmits an execution request of the registration mode input from the diagnostic device 30 to the management server 100 (Step S201). Next, the execution key register 65A determines whether or not an execution request could be transmitted to the management server 100 in Step S201 (Step S203). In a case in which the execution request could be transmitted to the management server 100, the execution key register 65A stores the execution key Ki received from the management server 100 in the storage 63 as execution key information 63A (Step S205).

Next, in a case in which the execution key Kt(m) is input from the diagnostic device 30 (Step S207), the execution key collator 65B executes an authentication process P on the basis of the execution key Kt(m) input from the diagnostic device 30 and the execution key Ki that is execution key information 63A (Step S209).

In a case in which authentication using the authentication process P is not successful (Step S211), the execution key collator 65B outputs a notification representing an indication thereof to the diagnostic device 30 and displays the notification on the display 33 (Step S213).

On the other hand, in a case in which authentication using the authentication process P is successful in Step S211, the electronic key register 65C executes the registration mode (Step S215). The electronic key register 65C determines whether or not key information has been received from the vehicle key 10 within a predetermined time (Step S217). In a case in which key information has been received from the vehicle key 10 within a predetermined time, the electronic key register 65C stores the received key information in the storage 63 as key information 63B (Step S219). Then, the electronic key register 65C ends the registration mode (Step S221).

Returning to Step S203, in a case in which the execution request could not be transmitted to the management server 100, the execution key register 65A outputs a notification representing an indication thereof to the diagnostic device 30 (Step S223). In this way, the execution key Kd and the execution key Kt(m) are input to the execution key collator 65B from the diagnostic device 30 that has input this notification (Step S225). Then, the controller 65 executes the process executed when it is difficult to perform communication (Step S300).

Next, one example of the process executed when it is difficult to perform communication will be described. First, the process (1) executed when it is difficult to perform communication will be described with reference to FIG. 10. FIG. 10 is a flowchart illustrating one example of the flow of a process (1) when it is difficult to perform communication. This process is a process for executing the conditional registration mode (1) described above.

First, the execution key collator 65B executes an authentication process Q based on the execution key Kd and the execution key Kt(m) input from the diagnostic device 30 (Step S301). In a case in which authentication using the authentication process Q is not successful (Step S303), the execution key collator 65B outputs a notification representing an indication thereof to the diagnostic device 30 and displays the notification on the display 33 (Step S305). On the other hand, in a case in which authentication using the authentication process Q is successful in Step S303, the electronic key register 65C executes the registration mode (Step S307).

During the execution of the registration mode, the execution key register 65A determines whether or not an execution request has been input from the diagnostic device 30 (Step S309). In a case in which an execution request has been input from the diagnostic device 30, the execution key register 65A causes the process to proceed to Step S201 illustrated in FIG. 9.

In this way, the immobilizer 60 can cause the process to transition to the authentication process P also during execution of the conditional registration mode (in other words, before elapse of a predetermined standby time described below) and can immediately register key information in a case in which authentication using the authentication process P is successful.

On the other hand, in a case in which an execution request has not been input from the diagnostic device 30 in Step S309, the electronic key register 65C determines whether or not a predetermined standby time has elapsed (Step S311). The standby time is a time that is sufficiently longer than a transition time in a normal registration mode executed in a case in which authentication is successful in the authentication process P and, for example, is about several hours or one day. The electronic key register 65C causes the process to return to Step S309 and repeats the process until a predetermined standby time elapses.

When the predetermined standby time elapses, the electronic key register 65C determines whether or not key information has been received from the vehicle key 10 within a predetermined time (Step S313). In a case in which key information has been received from the vehicle key 10 within the predetermined time, the electronic key register 65C stores the received key information in the storage 63 as key information 63B (Step S315). Then, the electronic key register 65C ends the registration mode (Step S317).

Next, a process (2) executed when it is difficult to perform communication will be described with reference to FIG. 11. FIG. 11 is a flowchart illustrating one example of the flow of a process (2) executed when it is difficult to perform communication. This process is a process executing the conditional registration mode (2) described above. The same reference sign will be assigned to the same process as that of the process (1) executed when it is difficult to perform communication described with reference to FIG. 10, and detailed description thereof will not be presented.

The electronic key register 65C determines whether or not key information has been received from the vehicle key 10 within a predetermined time after executing the registration mode in Step S307 (Step S321). In a case in which key information has been received from the vehicle key 10 within the predetermined time, the electronic key register 65C provisionally registers the received key information in the storage 63 (Step S323).

During execution of the registration mode, the execution key register 65A determines whether or not an execution request has been input from the diagnostic device 30 (Step S325). In a case in which an execution request has been input from the diagnostic device 30, the execution key register 65A causes the process to proceed to Step S201 illustrated in FIG. 9.

In this way, the immobilizer 60 can cause the process to proceed to the authentication process P also during execution of the conditional registration mode (in other words, a state in which the cancellation condition is not satisfied), and can immediately change provisional registration of the key information to normal registration in a case in which authentication using the authentication process P is successful. On the other hand, in a case in which an execution request has not been input from the diagnostic device 30, the canceller 65F determines whether or not a cancellation condition is satisfied (Step S327). The canceller 65F causes the process to return to Step S325 and repeats the process until it is determined that the cancellation condition is satisfied.

In a case in which the cancellation condition is satisfied, the canceller 65F deletes the key information that has temporarily been registered by the electronic key register 65C from the storage 64 (Step S329). Then, the electronic key register 65C ends the registration mode (Step S331).

According to the electronic key management device of this embodiment described above, by including the connector 31 that is mounted in the vehicle 70 and is used for a connection with the immobilizer 60 communicating with the management server 100 using the communicator 50 and the requester 35B that requests the management server 100 to transmit an execution key using the communicator 36 other than the immobilizer 60 in a case in which the immobilizer 60 connected through the connector 31 cannot communicate with the management server 100 using the communicator 50, the immobilizer 60 can execute a predetermined mode even in an environment in which it is difficult to communicate with the management server 100.

In a case in which the immobilizer 60 connected through the connector 31 cannot communicate with the management server 100 using the communicator 50, the conditional registration mode or the conditional invalidation mode is executed. In this way, the effect is restricted more than that of the normal registration mode or the normal invalidation mode, and accordingly, even if an operator executing each mode is a malicious third party, the use and the like of the electronic key 10 are restricted. As a result, the security of the vehicle can be improved.

Second Embodiment

An electronic key management system according to a second embodiment can be realized by changing a part of the components of the electronic key management system 1 according to the first embodiment. Hereinafter, description of components that are the same as those of the electronic key management system 1 according to the first embodiment will not be presented, and only different points will be described. In this embodiment, "S" is attached to the end of a reference sign of a component having changed points.

Figure 12:
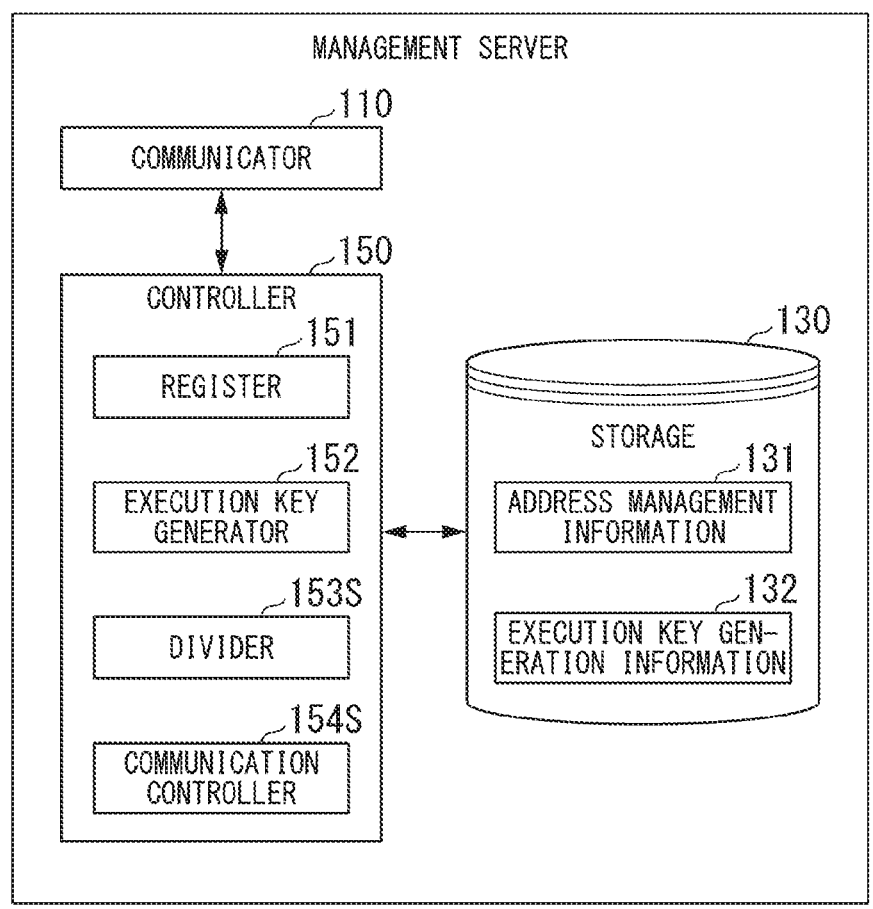
FIG. 12 is a configuration diagram of another management server.

FIG. 12 is a configuration diagram of a management server 100S. The management server 100S includes a divider 153S in addition to a register 151, an execution key generator 152, and a communication controller 154S.

The divider 153S generates a first execution key K1 and a second execution key K2 on the basis of an execution key K generated by the execution key generator 152. The divider 153S, for example, divides a digit string (may include characters) of the execution key K into two parts of a first half and a second half and sets a digit string of the first half as a first execution key K1 and seta a digital string of the second half as a second execution key K2. The execution key, for example, is a pin code of an 8-digit number. In this case, the divider 153S divides the execution key into 4-digit numbers, sets a four-digit number of the first half as a first execution key K1, and sets a four-digit number of the second half as a second execution key K2.

The communication controller 154S respectively transmits the first execution key K1 and the second execution key K2 generated by the divider 153S to a dealer terminal 40 and a user terminal 20. Hereinafter, although an example in which the first execution key K1 is transmitted to the dealer terminal 40 by the communication controller 154S, and the second execution key K2 is transmitted to the user terminal 20 will be described, transmission destinations of the information may be opposite thereto. For example, the communication controller 154S reads a dealer mail address associated with the execution key K generated by the execution key generator 152 from address management information 131 and transmits a mail including the first execution key K1 to the read dealer mail address. The communication controller 154 reads a user mail address associated with the execution key K generated by the execution key generator 152 from the address management information 131 and transmits a mail including the second execution key K2 to the read user mail address. A sales person B inputs a first execution key K1 and a second execution key K2 to an inputter 32 by referring to displays of the dealer terminal 40 and the user terminal 20. A diagnostic device 30 outputs the first execution key K1 and the second execution key K2 that have been input to an immobilizer 60 through a connector 31.

While not illustrated in the drawing, the immobilizer 60S includes an execution key collator 65BS. The execution key collator 65BS executes an authentication process P on the basis of an execution key Kt(m) received from the diagnostic device 30 and an execution key Ki that is execution key information 63A stored in a storage 63. The execution key collator 65BS may acquire a division method used by the divider 153S and generate an execution key Kt(m) on the basis of information input from the diagnostic device 30 in accordance with the acquired division method. For example, the execution key collator 65BS generates a connected execution key K1+K2 acquired by connecting the first execution key K1 and the second execution key K2 on the basis of information received from the diagnostic device 30. The execution key collator 65BS determines whether or not the generated connected execution key K1+K2 and an execution key Ki represented by the execution key information 63A match each other. In a case in which both keys match each other (K1+K2=Ki), the execution key collator 65BS authenticates the execution key Kt(m) received from the diagnostic device 30 as legitimate (in other words, determines that authentication is successful). On the other hand, in a case in which it is determined that both keys do not match each other through the collation, the execution key collator 65BS does not authenticate the execution key Kt(m) received from the diagnostic device 30 as legitimate (in other words, determines that authentication is not successful). An authentication process Q is similar thereto.

In this way, the immobilizer 60 cannot execute a registration mode or an invalidation mode without a second execution key K2 distributed to a legitimate owner A. Accordingly, it can be prevented that key information of an electronic key 10 is registered in the immobilizer 60 without a permission of a legitimate owner, and the vehicle 70 is illegitimately used using the registered electronic key 10. As a result, the security of the vehicle can be improved.

The embodiment described above can be represented as below.

An electronic key management system assisting device including a connector that is mounted in a vehicle and is used for a connection with an in-vehicle authentication device communicating with a management server using an in-vehicle communicator, a storage device, and a hardware processor executing a program stored in the storage device and configured such that the hardware processor, by executing the program stored in the storage device, detects that the in-vehicle authentication device connected through the connector cannot communicate with the management server, and, in a case in which it is determined that the communication cannot be performed, requests the management server to transmit an execution key for obtaining a permission for a transition to a registration mode in which an electronic key of the vehicle is registered in the in-vehicle authentication device or an invalidation mode in which the electronic key registered in the in-vehicle authentication device is invalidated using a communication device other than the in-vehicle communication device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The communication controller 154 may perform identification checking of a legitimate owner A and a sales person B before transmitting an execution key. For example, the communication controller 154 transmits checking information used for checking whether or not execution of a registration process or an invalidation process of the electronic key 10 is permitted to the vehicle 70 to the dealer terminal 40 and the user terminal 20. In the checking information, a vehicle body number of the vehicle 70, a date and time at which the request was transmitted, and the like may be included. In each of the dealer terminal 40 and the user terminal 20, a checking screen based on the checking information is displayed, and permission/no-permission buttons for inputting whether the execution of the registration process or the invalidation process is permitted are displayed on the checking screen. Each of the dealer terminal 40 and the user terminal 20 transmits operation details for the permission/no-permission buttons to the management server 100. In a case in which information representing an operation of the permission button is received from the dealer terminal 40 and the user terminal 20, the communication controller 154 transmits the execution key to the immobilizer 60 and transmits a first execution key and a second execution key generated by the divider 153S to the dealer terminal 40 and the user terminal 20.

The electronic key 10 may be substituted with a card key, the user terminal 20, or the like. In the case of a card key, the immobilizer 60 receives key information from the card key using a card reader disposed in the vehicle 70. In the case of a user terminal 20, the immobilizer 60 receives key information from the user terminal 20 using the communicator 50 or a radio communication device (for example, a Bluetooth (a registered trademark) unit) disposed in the vehicle 70.

The immobilizer 60 may execute a conditional registration mode or a conditional invalidation mode and, in a case in which each mode ends without executing the authentication process P during the execution of each mode and, next, in a case in which an execution request is input, may not transmit an execution request to the management server 100 in a case in which a predetermined condition is not satisfied. In the predetermined condition, for example, elapse of a predetermined time, input of confidential information (a password) maintained by the legitimate owner A or the sales person B, and the like are included. In this way, the security of the vehicle can be further improved.

The divider 153S may divide an execution key by alternately assigning a digit string of the execution key to a first execution key and a second execution key sequentially from the start. For example, in a case in which the execution key is "12345678:, the divider 153S may divide the execution key into a first execution key "1357" and a second execution key "2468". In accordance with this, the execution key collator 65B generates an execution key by alternately combining one digit of the first execution key and one digit of the second execution key from the start each time. In this example, although the division is performed by alternately assigning each one letter, the divider 153S may perform division by alternately assigning two or more characters or may perform division by assigning characters of a number different from the number of characters that have immediately previously been assigned. In the former case, for example, "1256" is assigned to the first execution key, and "3478" is assigned to the second execution key. In the latter case, for example, "1347" is assigned to the first execution key, and "2568" is assigned to the second execution key. The execution key collator 65B receives information representing a generation method (a method of generating a first execution key and a second execution key on the basis of the execution key) using the divider 153S from the management server 100 and connects the first execution key and the second execution key on the basis of the received information.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic key management system assisting device, comprising:
   a processor; and
   a memory that stores instructions that, when executed by the processor, facilitate performance operations, comprising:
   communicating, via a connector that is mounted in a vehicle and is used for a connection with an in-vehicle authentication device, with a management server using an in-vehicle communication device; and
   requesting the management server to transmit an execution key to obtain permission for a transition to a registration mode or an invalidation mode using a communication device other than the in-vehicle communication device in a case which the in-vehicle authentication device is not able to communicate with the management server using the in-vehicle communication device,
   wherein the registration mode is a mode in which an electronic key of the vehicle is registered in the in-vehicle authentication device,
   wherein the invalidation mode is a mode in which the electronic key registered in the in-vehicle authentication device is invalidated,
   wherein the management server is distinct from the in-vehicle communication device, the in-vehicle authentication device and the communication device, and provided independently outside the vehicle, and
   wherein the communication device is distinct from the in-vehicle communication device, the in-vehicle authentication device and the management server, and provided independently outside the vehicle.

2. The electronic key management system assisting device according to claim 1, wherein, after a request for requesting execution of the registration mode or the invalidation mode is output to the in-vehicle authentication device through the connector, in a case in which a notification indicating that the request is not able to be transmitted to the management server is input from the in-vehicle authentication device through the connector, the operations further comprise requesting the management server to transmit the execution key.

3. The electronic key management system assisting device according to claim 1, the operations further comprise:
   accepting an input operation and input information from an operator; and
   outputting the input information and the execution key received from the management server using the communication device to the in-vehicle authentication device through the connector.

4. An electronic key management system comprising:
   the electronic key management system assisting device according to claim 3;
   the in-vehicle communication device; and
   the in-vehicle authentication device including a circuit that performs first authentication based on the execution key input from the electronic key management system assisting device and the input information and executes the registration mode or the invalidation mode in a case in which the first authentication is successful.

5. The electronic key management system according to claim 4, wherein the circuit executes a process of registration or invalidation based on key information received from the electronic key under a condition that a predetermined time has elapsed after execution of the registration mode or the invalidation mode in a case in which the registration mode or the invalidation mode is executed in accordance with the first authentication being successful.

6. The electronic key management system according to claim 5, wherein the predetermined time is longer than that in a case in which second authentication based on the input information input from the electronic key management system assisting device and the execution key received from the management server using the in-vehicle communication device is successful.

7. The electronic key management system according to claim 6, wherein the circuit immediately executes the process of registration or invalidation based on key information received from the electronic key in a case in which the second authentication is successful before elapse of the predetermined time.

8. The electronic key management system according to claim 4,
   wherein the circuit executes a process of provisional registration or provisional invalidation based on received key information in a case in which the key information is received from the electronic key during execution of the registration mode or the invalidation mode in accordance with the first authentication being successful,
   wherein the processor returns the state to a state before the execution of the process executed by the circuit in a case in which a predetermined cancellation condition is satisfied after the execution of the process of the provisional registration or provisional invalidation using the circuit.

9. The electronic key management system according to claim 8, wherein the predetermined cancellation condition includes elapse of a predetermined time after the execution of the process of provisional registration or provisional invalidation.

10. The electronic key management system according to claim 8, wherein the predetermined cancellation condition includes a condition that the number of times of starting a drive source included in the vehicle after the execution of the process of the provisional registration or provisional invalidation becomes equal to or greater than a threshold.

11. The electronic key management system according to claim 8,
    wherein the circuit performs third authentication based on the input information input from the electronic key management system assisting device and the execution key received from the management server using the in-vehicle communication device and immediately executes a process of registration or invalidation based on key information received from the electronic key in a case in which the third authentication is successful before the cancellation condition is satisfied.

12. A method using a control computer of an electronic key management system assisting device including a connector that is mounted in a vehicle and is used for a connection with an in-vehicle authentication device communicating with a management server using an in-vehicle communication device, the method comprising:

detecting that the in-vehicle authentication device connected through the connector is not able to communicate with the management server; and requesting the management server to transmit an execution key for obtaining a permission for a transition to a registration mode or an invalidation mode using a communication device other than the in-vehicle communication device in a case in which it is detected that communication is not able to be performed, wherein the registration mode is a mode in which an electronic key of the vehicle is registered in the in-vehicle authentication device, wherein the invalidation mode is a mode in which the electronic key registered in the in-vehicle authentication device is invalidated, wherein the management server is distinct from the in-vehicle communication device, the in-vehicle authentication device and the communication device, and provided independently outside the vehicle, and wherein the communication device is distinct from the in-vehicle communication device, the in-vehicle authentication device and a management server, and provided independently outside the vehicle.

13. A computer-readable non-transitory storage medium having a program stored thereon, the program causing a control computer of an electronic key management system assisting device including a connector that is mounted in a vehicle and is used for a connection with an in-vehicle authentication device communicating with a management server using an in-vehicle communication device to execute:

detecting that the in-vehicle authentication device connected through the connector is not able to communicate with the management server; and requesting the management server to transmit an execution key for obtaining a permission for a transition to a registration mode or an invalidation mode using a communication device other than the in-vehicle communication device in a case in which it is detected that communication is not able to be performed, wherein the registration mode is a mode in which an electronic key of the vehicle is registered in the in-vehicle authentication device, wherein the invalidation mode is a mode in which the electronic key registered in the in-vehicle authentication device is invalidated, wherein the management server is distinct from the in-vehicle communication device, the in-vehicle authentication device and the communication device, and provided independently outside the vehicle, and wherein the communication device is distinct from the in-vehicle communication device, the in-vehicle authentication device and the management server, and provided independently outside the vehicle.

14. The electronic key management system assisting device according to claim 1,
wherein the in-vehicle communication device is connected to a network through a cellular network or a Wi-Fi network.

15. The electronic key management system assisting device according to claim 1,
wherein the communication device is connected to a network through a cellular network or a Wi-Fi network.

16. The electronic key management system assisting device according to claim 1,
wherein the communication device is configured to include a circuit configured to diagnose a malfunction of the vehicle, and
wherein when the circuit configured to diagnose the malfunction determines that the malfunction occurs in the vehicle, the communication device is operated to obtain the execution key from a network connected through a cellular network or a Wi-Fi network.

* * * * *